United States Patent
Morein

(10) Patent No.: US 6,457,034 B1
(45) Date of Patent: Sep. 24, 2002

(54) METHOD AND APPARATUS FOR ACCUMULATION BUFFERING IN THE VIDEO GRAPHICS SYSTEM

(75) Inventor: Stephen L. Morein, Cambridge, MA (US)

(73) Assignee: ATI International SRL (BB)

( * ) Notice: Subject to any disclaimer, the term of this patent is extended or adjusted under 35 U.S.C. 154(b) by 0 days.

(21) Appl. No.: 09/432,856

(22) Filed: Nov. 2, 1999

(51) Int. Cl.[7] ................................................. G06F 7/38
(52) U.S. Cl. ........................................ 708/490; 345/422
(58) Field of Search ................................. 708/490, 523, 708/501; 345/422, 643

(56) References Cited

U.S. PATENT DOCUMENTS

| | | | | |
|---|---|---|---|---|
| 5,502,798 A | * | 3/1996 | Ito | 345/422 |
| 5,872,729 A | * | 2/1999 | Deolaliker | 708/523 |
| 5,953,014 A | * | 9/1999 | Wood | 345/422 |
| 6,075,544 A | * | 6/2000 | Malachowsky | 345/422 |
| 6,115,047 A | * | 9/2000 | Deerino | 345/422 |

* cited by examiner

Primary Examiner—Tan V. Mai

(74) Attorney, Agent, or Firm—Vedder, Price, Kaufman & Kammholz

(57) ABSTRACT

A method and apparatus for supporting accumulation buffering in a video graphics system is presented. An accumulation buffer is included in the system, and the accumulation buffer stores an accumulation data set for each pixel of a frame. Preferably, each accumulation data set includes accumulated color data and a counter value. A Z buffer is included in the system, where the Z buffer stores Z data for each pixel of the frame. A drawing buffer stores a color data set for each pixel of the frame, where each color data set includes color data and a valid indication. A mask buffer includes a plurality of pixel block indicators, where each of the plurality of pixel block indicators corresponds to a plurality of pixels of the frame. When a pixel block indicator is set, pixels included in a corresponding plurality of pixels that have set valid indications in the drawing buffer are understood to have valid color data stored in the drawing buffer and valid Z data stored in the Z buffer. A rendering block renders images into the drawing buffer and the Z buffer while utilizing the pixel block indicators from the mask buffer and the valid indications of the drawing buffer. Utilization of the pixel block indicators and valid indications simplifies the rendering process. At the completion of each image rendering, a controller blends color data for those pixels that have valid color data stored in the drawing buffer with the currently accumulated color data for corresponding pixels stored in the accumulation buffer.

19 Claims, 5 Drawing Sheets

METHOD AND APPARATUS FOR ACCUMULATION BUFFERING IN THE VIDEO GRAPHICS SYSTEM

FIELD OF THE INVENTION

The invention relates generally to video graphics processing and more particularly to a method and apparatus for accumulation buffering in a video graphics system.

BACKGROUND OF THE INVENTION

Computer displays and other high resolution display devices such as high definition televisions (HDTV), projectors, printers, plotters, and alike, present an image to the viewer as an array of individual picture elements, or pixels. The individual pixels are each given a specific color, which corresponds to the color of the image at the location of the particular pixel. If the pixels are closely spaced, the viewers visual system performs a filtering of the individual pixel colors to form a composite image. If the partitioning of the image into individual pixel elements is performed properly, and the pixels are close enough together, the viewer perceives the displayed array of pixels as a virtually continuous image. Despite the viewers visual filtering, the viewer remains sensitive to aberrations in the image, and video graphics systems must be designed to minimize these aberrations.

In order to avoid one potential source of visual aberrations, accumulation buffering is used to avoid aliasing in the graphics image display. In accumulation buffering, multiple images are rendered and then combined in an accumulation buffer where the multiple images are blended. Utilization of accumulation buffering is an anti-aliasing technique that is well known in the art.

Because accumulation buffering requires multiple images to be rendered prior to their combination to produce a resultant image, a large number of memory accesses and blending operations are performed for each image that is included in the accumulation buffer. In some instances, some of these memory operations and blending operations are unnecessary as new pixel information may not be generated for every pixel during the rendering of an image. As such, blending all of the pixels for a particular image with the information in the accumulation buffer may not change the accumulated values for all of the pixels in the accumulation buffer.

Therefore, a need exists for a method and apparatus that supports accumulation buffering in a video graphics system that reduces the number of memory operations and blending operations necessary to produce the resultant accumulated image.

DETAILED DESCRIPTION OF A PREFERRED EMBODIMENT OF THE INVENTION

Figure 1:
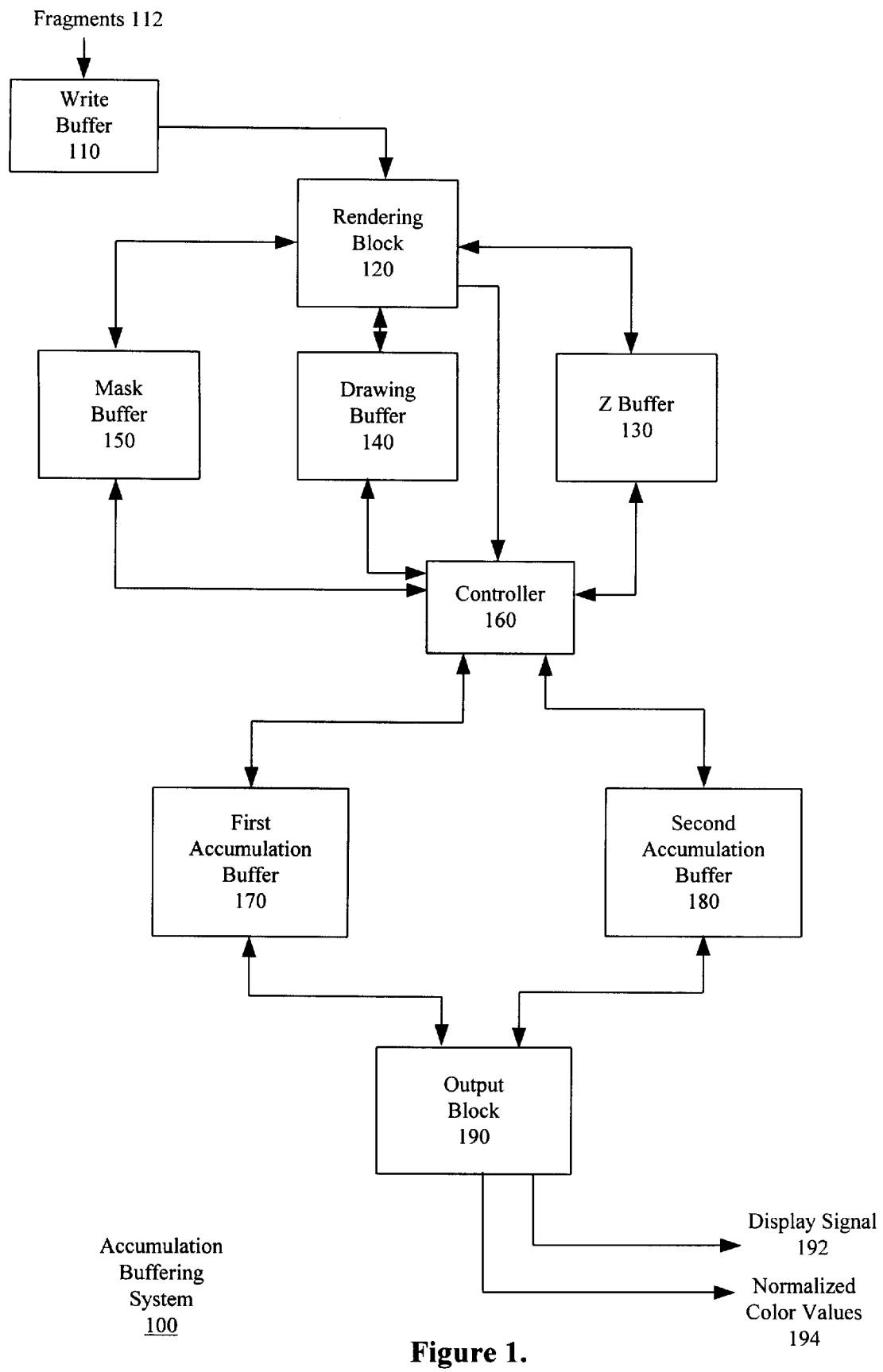
FIG. 1 illustrates a block diagram of an accumulation buffering system in accordance with a particular embodiment of the present invention.

Generally, the present invention provides a method and apparatus for supporting accumulation buffering in a video graphics system. An accumulation buffer is included in the system, and the accumulation buffer stores an accumulation data set for each pixel of the frame. Preferably, each accumulation data set includes accumulated color data and a counter value. A Z buffer is included in the system, where the Z buffer stores Z data for each pixel of the frame. A drawing buffer stores a color data set for each pixel of the frame, where each color data set includes color data and a valid indication. A mask buffer includes a plurality of pixel block indicators, where each of the plurality of pixel block indicators corresponds to a plurality of pixels of the frame. When a pixel block indicator is set, pixels included in a corresponding plurality of pixels that have set valid indications in the drawing buffer are understood to have valid color data stored in the drawing buffer and valid Z data stored in the Z buffer. A rendering block renders images into the drawing buffer and the Z buffer while utilizing the pixel block indicators from the mask buffer and the valid indications of the drawing buffer. Utilization of the pixel block indicators and valid indications simplifies the rendering process. At the completion of each image rendering, a controller blends color data for those pixels that have valid color data stored in the drawing buffer with the currently accumulated color data for corresponding pixels stored in the accumulation buffer. When a blending operation occurs for a particular pixel, the counter value for that pixel in the accumulation buffer is incremented. When all of the images for a particular accumulation operation have been accumulated in the accumulation buffer, the color values stored in the accumulation buffer are normalized by dividing the color data value for a particular pixel by the counter value corresponding to the particular pixel.

By including a mask buffer that indicates whether or not there is valid color and Z information currently stored for a plurality of pixels, rendering and accumulation operations can be simplified. For accumulation operations, those pixels which do not have valid color data for accumulation are not accessed and blended. Similarly, rendering operations are simplified as the rendering block can readily determine whether or not there is valid data for a particular pixel stored in the drawing buffer and the Z buffer. When valid data is not currently stored in the drawing buffer or the Z buffer for a particular pixel, the rendering block can simply store fragment data corresponding to that pixel in the corresponding locations within the drawing buffer and the Z buffer without having to perform any blending operations. The drawing buffer and Z buffer can also easily be virtually cleared by clearing the mask buffer. Even though residual data may remain in the drawing buffer and the Z buffer, this data is invalid, which is indicated by the cleared pixel block indicators in the mask buffer.

For the purposes of this description, "set" and "clear" or "cleared" are used when referring to the rendering of a signal, status bit, or similar apparatus into its logically true or logically false state, respectively. If the logically true state is a logic level one, the logically false state is a logic level zero. If the logically true state is zero, the logically false state is a logic level one.

The invention can be better understood with reference to FIGS. 1–5. FIG. 1 illustrates an accumulation buffering system 100 that includes a rendering block 120, a mask buffer 150, a drawing buffer 140, a Z buffer 130, a controller 160, and a first accumulation buffer 170. The rendering block 120 is operably coupled to the mask buffer 150, the drawing buffer 140, the Z buffer 130, and the controller 160. The controller 160 is preferably coupled to each of the blocks in the system 100 such that it can control overall system operations. The accumulation buffering system 100 may be used in a video graphics system for rendering images in an antialiasing environment. Thus, the artifacts associated with aliasing are avoided by deriving a resultant or accumulated image from a plurality of rendered images that are blended together. The rendering block 120 renders images into the drawing buffer 140 and the Z buffer 130. The Z buffer 130 stores Z data for each pixel of the frame, and the drawing buffer stores color data for each pixel of the frame. A write buffer 110 that is coupled to the rendering block 120 may be included in the system such that portions of the image being rendered can be stored within the write buffer 110 prior to being provided to the rendering block 120 for rendering. The write buffer 110 receives fragments 112 for rendering, where such fragments may be generated based on the processing of graphics primitives, which is described in additional detail with respect to FIG. 3, below. Each pixel within the frame is identified by a set of coordinate data. The fragments 112 received by the accumulation buffering system 100 include coordinate data such that the pixel to which a particular fragment corresponds can be identified.

In order to perform the rendering operations, the rendering block 120, which may also be referred to as a render backend block, blends received pixel fragments 112 with corresponding pixel data stored within the drawing buffer 140 and the Z buffer 130. If valid color and Z information for a particular pixel are currently stored in the drawing buffer 140 and the Z buffer 130, this information is retrieved and blended with a corresponding fragment before the resultant color and Z values are stored back in the drawing buffer 140 and the Z buffer 130.

Figure 2:
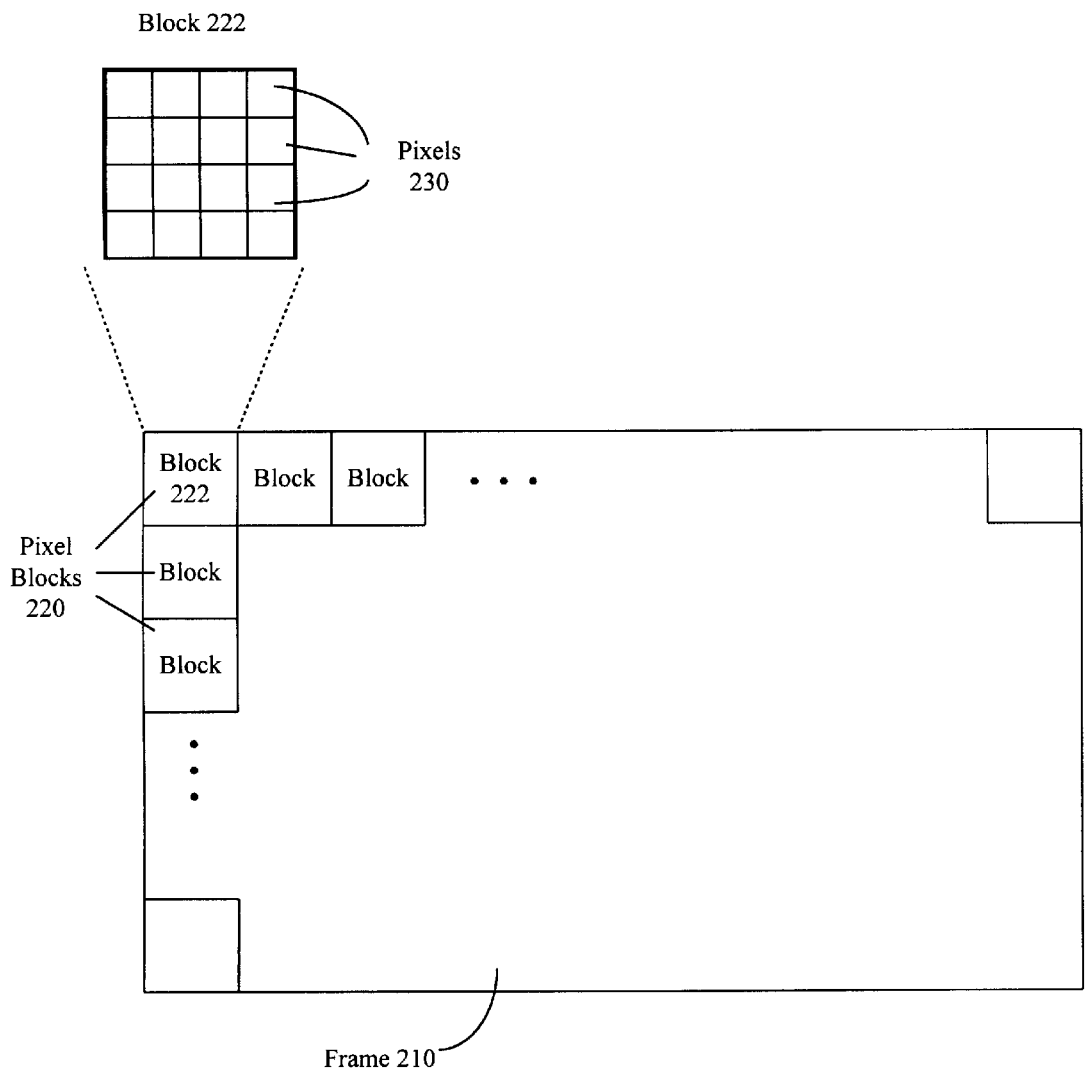
FIG. 2 illustrates a graphical representation of a frame that includes a plurality of pixel blocks in accordance with a particular embodiment of the present invention.

In order to simplify the rendering operations and subsequent accumulation operations, the mask buffer 150 is included in the accumulation buffering system 100. The mask buffer 150 includes a plurality of pixel block indicators, where each pixel block indicator corresponds to a plurality of pixels. FIG. 2 illustrates a frame 210 that includes a plurality of pixel blocks 220. The number of pixel blocks 220 included in the frames 210 is based on the size of each of the pixel blocks. Note that the pixel blocks 220 need not be rectangular or square in shape, and may vary in shape. As is shown with respect to the pixel block 222, each.pixel block includes a plurality of pixels 230. For the example illustrated in FIG. 2, each pixel block is shown to include 16 pixels.

A pixel block indicator, which may be a single bit, is included in the mask buffer 150 for each pixel block in the frame. When the accumulation buffering system 100 is initialized, or after each image accumulation has completed, the mask buffer 150 is cleared. A cleared pixel block indicator in the mask buffer 150 indicates that no valid data is stored for the corresponding pixel block in the drawing buffer 140 and the Z buffer 130. Thus, although data still may be present in the drawing buffer 140 and the Z buffer 130, a clear pixel block indicator in the mask buffer 150 renders this data invalid.

If a pixel block indicator within the mask buffer 150 is set, at least one pixel within the corresponding pixel block has valid color data in the drawing buffer 140 and valid Z data in the Z buffer 130. The drawing buffer 140 includes a valid indication for each pixel within the frame. The valid indication may be single bit. If the valid indication for a pixel is clear and the pixel block indicator corresponding to the pixel block in which that pixel is included is set, the data stored for that pixel is invalid. If the valid indication for a pixel is set when the pixel block indicator for the pixel block in which the pixel is included is also set, the color data stored within the drawing buffer 140 for that pixel is valid. In addition, valid color data in the drawing buffer 140 implies valid Z data within the Z buffer 130 for a particular pixel.

Thus, when the rendering block 120 prepares to blend a fragment with stored color and Z information in the drawing buffer 140 and the Z buffer 130, the rendering block 120 can consult the mask buffer 150 to determine if the pixel block to which the fragment will be applied is clear. If the pixel block to which the fragment is to be applied is clear, the rendering block 120 can store the color data for the fragment at the location within the drawing buffer 140 corresponding to the appropriate pixel within the pixel block. Assuming that the pixel block was clear as indicated by the pixel block indicator, the rendering block 120 sets the valid indication for that pixel within the drawing buffer 140 and clears the valid indications for the remaining pixels included in the pixel block within which the recently modified pixel is included. This clearing of other pixel's valid indications is performed because there may be residual data in the drawing buffer 140 that is only virtually cleared through the use of the pixel block indicators within the mask buffer 150.

In addition to setting the valid indication for the pixel, the pixel block indicator for the pixel block within which the pixel is included is set within the mask buffer 150, indicating that valid data for that pixel block is stored within the drawing buffer 140. Note that because the Z buffer was also virtually clear, the Z data corresponding to the fragment can also simply be stored at the appropriate location within the Z buffer. No valid indications need be included in the Z buffer as the valid indications within the drawing buffer 140 can be used to determine whether or not there is valid information stored at the same location within the Z buffer 130.

If the rendering block 120 determines that the pixel block to which the fragment is to be applied is not clear based on the pixel block indicator for that pixel block, the valid indication within the drawing buffer 140 for the pixel to which the fragment corresponds must be examined. If the valid indication for the pixel is clear, indicating invalid data, the color corresponding to the fragment can simply be stored in the location corresponding to the pixel and the valid indication set. If the valid indication is already set, the color data stored within the drawing buffer 140 and the Z data stored within the Z buffer 130 for the pixel must be retrieved such that the fragment can be blended with the information already contained within the buffers. The resultant color and Z information can then be stored back in the appropriate locations within the buffers and the valid indication left in the set state. Such blending operations are well known in the art.

Thus, the rendering block 120 may simplify its rendering operations greatly by determining whether or not valid data is currently stored for a pixel based on the pixel block indicators stored within the mask buffer 150 and the valid indication for each pixel stored within the drawing buffer 140.

In an example system, the drawing buffer may store 32 bits of color data per pixel plus a single valid bit as the valid indication. In other embodiments, 16 bits of color may be stored, where the color information may include RGB color information. In the example system, the Z buffer 130 may store 16 bits of Z data per pixel. The mask buffer 150 may include one pixel block indicator per 16 pixels within the frame. The memory utilized for the mask buffer 150, the drawing buffer 140, and the Z buffer 130 may be a single memory device that is shared or may include a number of memory devices such that each of the buffers is implemented in separate blocks that are individually accessible. As is apparent to one of ordinary skill in the art, the number of bits allocated to different parameters may vary from system to system and those provided herein are merely one example.

Once rendering of an image is complete, the rendering block 120 indicates to the controller 160 that the information stored within the drawing buffer 140 should be transferred to the accumulation buffer. The accumulation buffering system 100 is shown to include a first accumulation buffer 170 and a second accumulation buffer 180. Two accumulation buffers may be included in the system such that one accumulation buffer can be used for current accumulation operations while the other accumulation buffer is used for providing data for normalization and output. For the example described below, it is assumed that the first accumulation buffer 170 is the buffer to which the accumulation operation is currently occurring, whereas the second accumulation buffer 180 is currently acting as the output buffer for the accumulation buffering system 100.

The controller 160 may be a processor, a state machine, or other circuitry. Similarly, the rendering block 120 may be a state machine or processor. The rendering block 120 and the controller 160 may be implemented using a single processor or state machine that performs the functions of both blocks. Once the controller 160 receives an indication that the image has been rendered to the drawing buffer 140, the controller adds the information stored within the drawing buffer 140 with that already included in the first accumulation buffer 170. The controller 160 can perform the accumulation operation in a much more efficient manner through the use of the mask buffer 150. By examining the pixel block indicators stored within the mask buffer 150, the controller 160 can determine which pixel blocks within the drawing buffer 140 include relevant valid data that should be added to the data currently stored within the first accumulation buffer 170. If a pixel block indicator indicates that a set of pixels remains in the cleared state, there is no need to fetch the cleared information for accumulation. Thus, the controller 160 can avoid unnecessary accumulation operations by examining the pixel block indicators in the mask buffer 150.

When the controller 160 finds a pixel block indicator within the mask buffer 150 that is set, the controller 160 blends the color data for the valid pixels (as indicated by the valid indications in the drawing buffer) in the pixel block corresponding to the set pixel block indicator with the information corresponding to those pixels within the first accumulation buffer 170. In order to determine for which pixels valid color data exists within the drawing buffer 140, the controller 160 must examine both the pixel block indicators within the mask buffer 150 and the valid indications for the pixels stored within the drawing buffer 140. Both the pixel block indicator for a pixel block and the valid indication for a pixel within the pixel block must be set for valid data to be stored within the drawing buffer 140 for that pixel. The first accumulation buffer 170 stores an accumulation data set for each pixel of the frame. Each accumulation data set includes accumulated color data and a counter value. Blending color data from the drawing buffer 140 with that stored in the first accumulation buffer 170 may be accomplished by simply adding the color data stored in the drawing buffer 140 to the accumulated color data stored in the first accumulation buffer 170. For example, if the color data includes red, green, and blue color portions, the value for each of these color portions in the drawing buffer 140 will be added to the value for each of the portions currently stored within the first accumulation buffer 170. The counter value in the first accumulation buffer 170 corresponding to the pixel to which the color data from the drawing buffer 140 has been added is then incremented to reflect that another set of color data is included for that pixel in the accumulation buffer 170. Thus, if data from four images is accumulated for a pixel within the first accumulation buffer 170, the counter value for that pixel will reflect a value of four.

Once a predetermined number of accumulation operations have occurred such that the color data for a predetermined number of images has been accumulated within the first accumulation buffer 170, the second accumulation buffer 180 may become the active accumulation buffer and the first accumulation buffer 170 may begin to act as an output buffer such that the data stored within the first accumulation buffer 170 is normalized and provided as output. Note that once a subsequent set of images have been rendered and accumulated, the second accumulation buffer 180 will become the output buffer and the first accumulation buffer 170 will become the active accumulation buffer for the next set of accumulation operations.

The output block 190, which is operably coupled to the first accumulation buffer 170 and the second accumulation buffer 180, normalizes color values stored in whichever buffer is acting as the output buffer by dividing accumulated color data for a pixel in the frame by the counter value corresponding to the pixel. Thus, if a pixel has color data corresponding to four rendered images stored in the accumulation buffer that is acting as the output buffer, the counter value for that pixel within the accumulation buffer will indicate a count of four. The output block 190 divides the value for the accumulated color data by the counter value to produce normalized color values 194. Note that if the color data for each pixel includes multiple color portions, such as red, green, and blue portions, each of these portions will be treated individually by the output block 190 (i.e. the green value will be divided by four, the red by four, and the blue by four).

In one embodiment, the output block 190 may include a display digital to analog converter that performs the division as part of the digital to analog conversion. The output of the digital to analog converter may be a display signal 192 that could be provided directly to an analog display.

In another embodiment, the output block 190 may simply normalize the color data included in the output buffer to produce the normalized color values 194. The normalized color values 194 may then be added to a frame buffer that includes additional image data that may or may not be derived utilizing accumulation buffering. Thus, a displayed image may be generated from a frame buffer that includes some image data that has been processed through the use of the accumulation buffering system 100 of FIG. 1, and may also include image data that has not been subjected to accumulation buffering operations.

By including the mask buffer 150, the controller 160 can quickly determine whether or not there is valid data for a group of pixels in the drawing buffer 140. As such, accumulation operations within the accumulation buffering system 100 can be simplified. Including multiple accumulation buffers within the accumulation buffering system enables one buffer to act as an active buffer for accumulation operations while the other acts as an output buffer for normalization and data output operations. Note that the system could operate using a single accumulation buffer if the delays associated with normalization and output of the accumulated data are tolerable in the particular system in which the accumulation buffering system 100 is employed.

Figure 3:
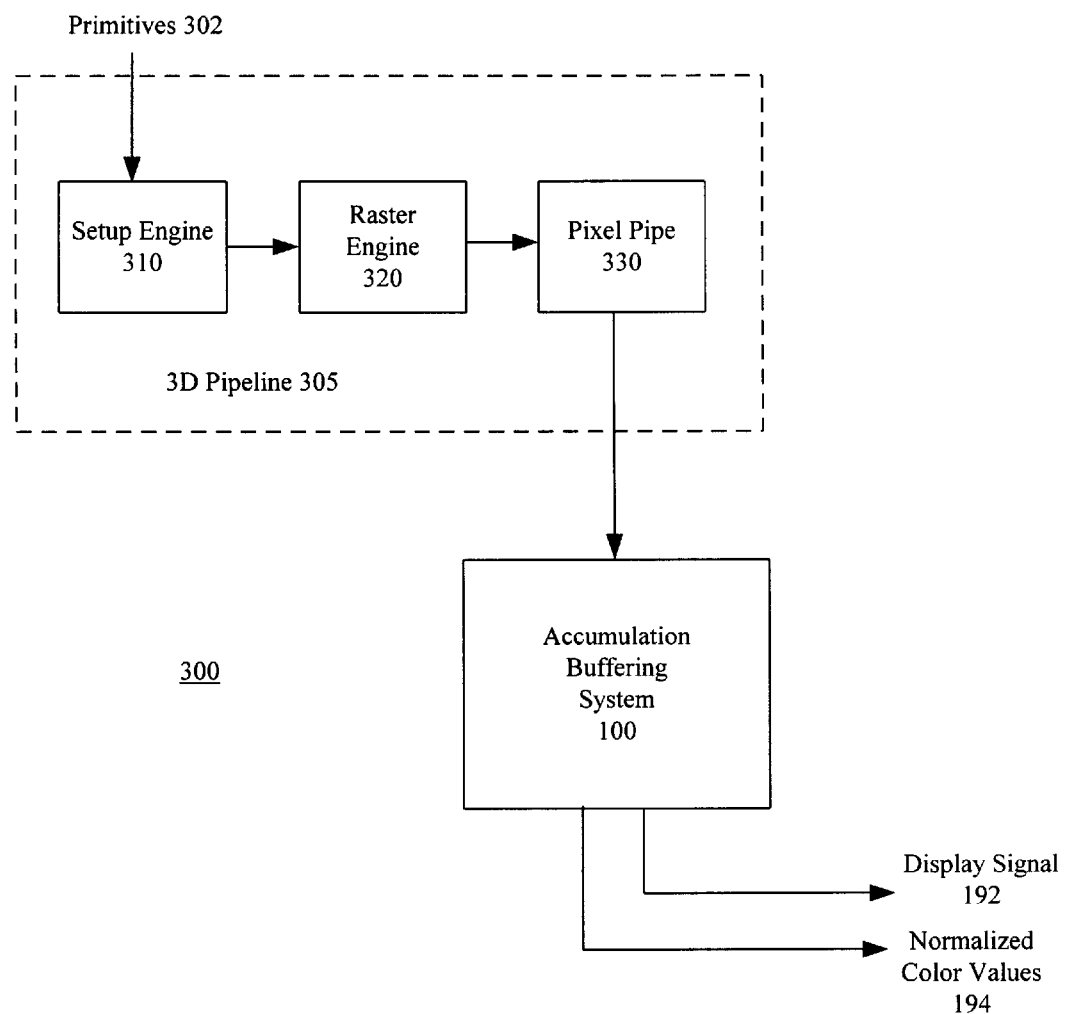
FIG. 3 illustrates a block diagram of a video graphics circuit in accordance with a particular embodiment of the present invention.

FIG. 3 illustrates a circuit 300 that includes a 3D pipeline 305 operably coupled to the accumulation buffering system 100 that was illustrated in FIG. 1. The 3D pipeline 305 preferably includes a setup engine 310, a raster engine 320, and a pixel pipe 330. Preferably, the 3D pipeline 305 is included in a video graphics integrated circuit that may also include two-dimensional graphics processing and other processing blocks that may affect the data within the accumulation buffering system 100. Such an integrated circuit is preferably capable of, among other things, rendering three-dimensional video graphics images for display.

The set up engine 310 produces primitive slope information based on received graphics primitives 302. Preferably, the graphics primitives 302 are triangle primitives, which are commonly used in video graphics applications. Slope information corresponding to these primitives is provided to the raster engine 320, which is operably coupled to the set up engine 310. The raster engine 320 generates pixel fragments from the primitive slope information. Preferably, each pixel fragment includes a color value, a set of coordinates indicating a pixel in the display frame to which the fragment corresponds, and a Z value for the fragment.

The raster engine 320 provides the pixel fragments to the pixel pipe 330, which is operably coupled to the raster engine 320. The pixel pipe 330 performs various operations that may modify the color of the pixel fragment as received from the raster engine 320. Such operations may include texture mapping operations. The textured fragments resulting from the operations performed by the pixel pipe 330 are then passed to the accumulation buffering system 100, which is operably coupled to the pixel pipe 330.

As was described with respect to FIG. 1, the accumulation buffering system processes the fragments and generates or more of the resultant display signal 192 and the normalized color values 194 through accumulation buffering operations that are often used in antialiasing operations concerning video graphics information. In other embodiments, the accumulation buffering system may include a frame buffer that stores the normalized color values 194 such that the normalized color values 194 can be retrieved by other components of the system in which the circuit 300 is included.

Figure 4:
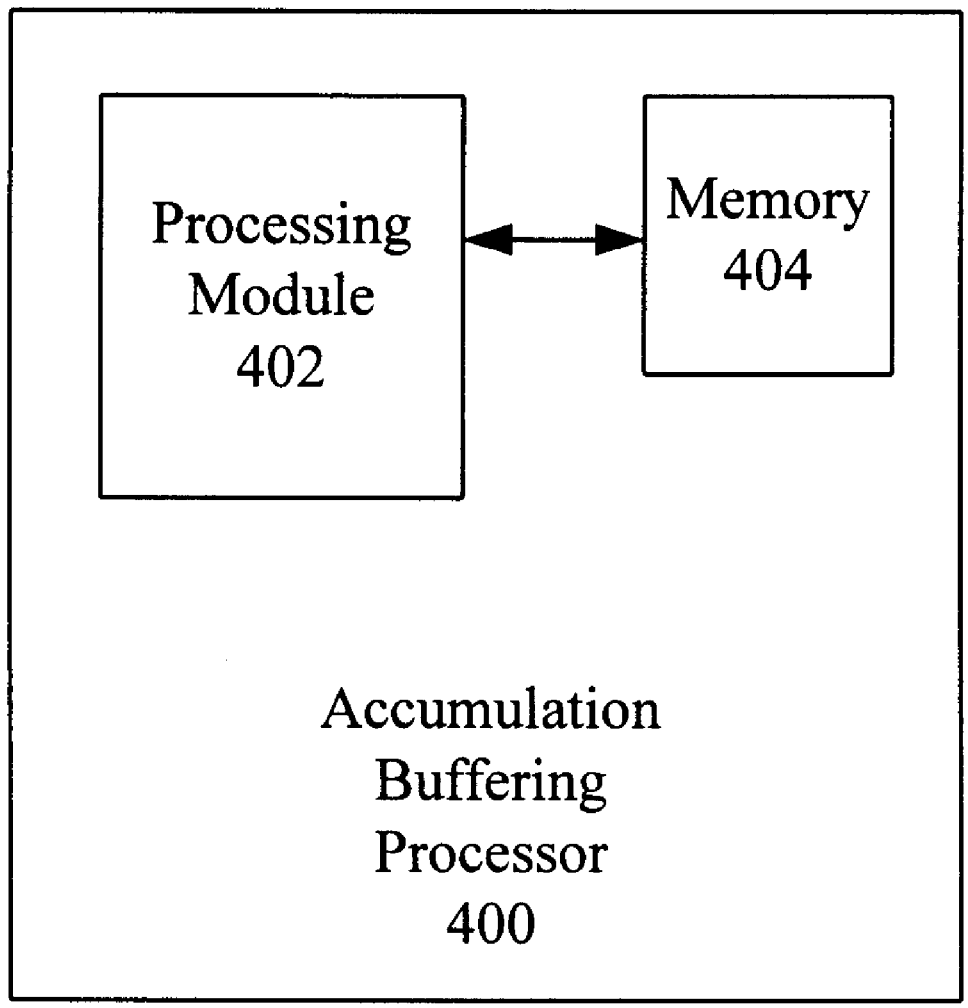
FIG. 4 illustrates a block diagram of an accumulation buffering processor in accordance with a particular embodiment of the present invention.

FIG. 4 illustrates an accumulation buffering processor 400 that may be used for controlling an accumulation buffering system 100 or portions of a similar accumulation buffering system. The accumulation buffering processor 400 includes a processing module 402 and memory 404. The processing module 402 may include a single processing entity or a plurality of processing entities. Such a processing entity may be a microprocessor, microcontroller, digital signal processor, state machine, logic circuitry, or any device that processes information based on operational or programming instructions.

The memory 404 may be a single memory device or a plurality of memory devices. Such a memory device may be a read only memory device, random access memory device, floppy disk, hard drive memory, or any device that stores digital information. Note that when the processing module 402 has one or more of its functions performed by a state machine or logic circuitry, the memory containing the corresponding operational instructions may be embedded within the state machine or logic circuitry.

Figure 5:
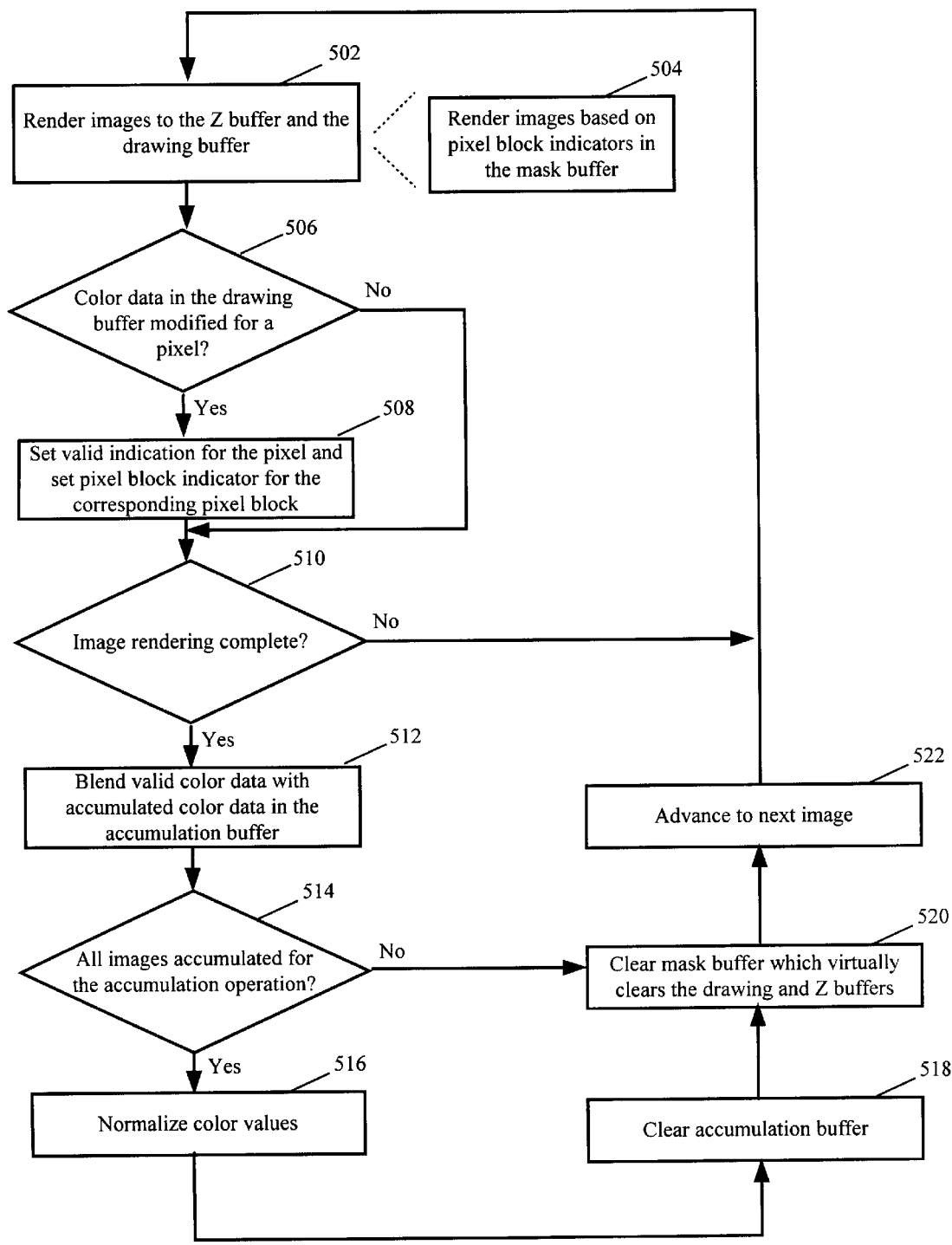
FIG. 5 illustrates a flow diagram of a method for accumulation buffering in accordance with a particular embodiment of the present invention.

The memory 404 stores programming or operational instructions that, when executed by the processing module 402, enable the processing module 402 to perform the method illustrated in FIG. 5. Note that the accumulation buffering of processor 400 may implement some of the functions of FIG. 5 through software stored in the memory 404, whereas other portions may be implemented using hardware or circuitry included within the accumulation buffering processor 400. Thus, in some embodiments, a mix of hardware and software may be used to perform the method illustrated in FIG. 5.

FIG. 5 illustrates a method for accumulation buffering of color data for a frame. The method begins at step 502 where images are rendered to a drawing buffer and a Z buffer. The Z buffer stores Z data for each pixel of the frame. The drawing buffer stores a color data set for each pixel of the frame, where each color data set includes color data and a valid indication. The rendering operations performed at step 502 may be performed as illustrated at step 504 based on pixel block indicators stored in a mask buffer. The mask buffer includes a plurality of pixel indicators, where each of the plurality of pixel indicators corresponds to a plurality of pixels within the frame. Each pixel block indicator indicates whether there is any valid data stored in the drawing buffer for any of the pixels included in the pixel block to which the pixel block indicator corresponds. The rendering operations performed using the pixel block indicators is preferably performed as was described with respect to FIG. 1 above.

At step 506, it is determined if a portion of the rendering operations modify color data stored for a pixel in the drawing buffer. If the rendering operation performed at step 502 does not alter the data currently stored in the drawing buffer for a pixel, the method proceeds to step 510. If a modification to the color data for a pixel is determined to occur at step 506, the method proceeds to step 508.

At step 508, the valid indication for the pixel that has been modified is set to indicate that valid color data is stored within the drawing buffer for that particular pixel. The pixel block indicator stored in the mask buffer for the set of pixels that includes the pixel that has been modified is examined to determine if it is currently set. If it is set, the method proceeds to step 510. If the pixel block indicator has not been set when step 508 is entered, it is set prior to proceeding to step 510, and additionally any valid indications corresponding to additional pixels for the pixel block to which the pixel block indicator that has been set are cleared such that any residual color data stored in the drawing buffer is understood to be invalid.

At step 510, it is determined if the rendering operations for a particular image are complete. If not, the method returns to step 502 where rendering operations for the image continue. If the image rendering is complete as determined at step 510, the method proceeds to step 512.

At step 512, valid color data included in the drawing buffer is blended with accumulated color data stored in an accumulation buffer. Valid color data in the drawing buffer is indicated by valid pixel block indicators in the mask buffer and valid indications in the drawing buffer as was described with respect to FIG. 1 above. The accumulation buffer, within which the accumulated color data is stored, preferably also includes a counter value for each pixel. When valid color data is added to the accumulated color data for a particular pixel, its counter value is incremented to reflect the number of contributing images to the accumulated color data.

At step 514, it is determined whether or not all of the images to be accumulated for a particular accumulation buffering operation have been rendered and accumulated. If not, the method proceeds to step 520 where the mask buffer is cleared. Clearing the mask buffer virtually clears the drawing and Z buffers as validity of the information included in the drawing and Z buffers is dependent on the configuration of the pixel block indicators stored in the mask buffer. Thus, even though residual data remains in the drawing and Z buffers, a cleared mask buffer will indicate that the data included in these buffers is invalid. Upon completion of step 520 the method proceeds to step 522 where the system advances to the next image for rendering. The method then returns to step 502 where rendering operations for the subsequent image commence.

If it is determined at step 514 that all of the images for a particular accumulation operation have been accumulated in the accumulation buffer, the method proceeds to step 516. At step 516, the color values stored in the accumulation buffer are normalized. Preferably, this is accomplished by dividing the accumulated color data values by the is counter values stored in the accumulation data sets within the accumulation buffer. Note that in other embodiments, the accumulation buffering performed may normalize the data within the accumulation buffer as the rendering of each image is completed. Thus, there would be no need for normalization of the resulting accumulated color values after all of the images in such systems have been accumulated.

The normalization of the color values that occurs at step 516 may include generating the normalized color values such that the normalized color values are included in an analog display signal. This, a digital to analog converter (DAC) that is configured based on the counter value for each pixel could be used to perform the normalization with the result being an analog display signal. In other embodiments, the normalization occurring at step 516 may produce normalized color values that can be combined with additional image data in a frame buffer for use elsewhere in the video graphics processing system.

As was described with respect to FIG. 1, the accumulation buffer that stores the values being normalized could be supplemented with an additional accumulation buffer that can act as the active accumulation buffer while the other accumulation buffer acts as an output accumulation buffer. Thus, accumulation operations can store accumulated color data in one accumulation buffer while the accumulated color data in the other accumulation buffer is normalized and provided as output.

Once all of the images have been accumulated and the color data has been normalized at step 516, the method proceeds to step 518 where the accumulation buffer is cleared. Once the accumulation buffer has been cleared at step 518 it is ready for use in subsequent accumulation operations. The method then proceeds to steps 520 and 522 before returning to step 502 for subsequent rendering operations.

It should be understood that the implementation of variations and modifications of the invention in its various aspects should be apparent to those of ordinary skill in the art, and that the invention is not limited to the specific embodiments described. It is therefore contemplated to cover by the present invention, any and all modification, variations, or equivalents that fall within the spirit and scope of the basic underlying principles disclosed and claimed herein.

What is claimed is:

1. An accumulation buffering system, comprising:

a Z buffer that stores Z data for each pixel of a frame;

a drawing buffer that stores a color data set for each pixel of the frame, wherein each color data set includes color data and a valid indication;

a mask buffer, wherein the mask buffer includes a plurality of pixel block indicators, wherein each of the plurality of pixel block indicators corresponds to a plurality of pixels of the frame, wherein when a pixel block indicator is set, pixels included in a corresponding plurality of pixels that have set valid indications in the drawing buffer have valid color data stored in the drawing buffer and valid Z data stored in the Z buffer;

a first accumulation buffer, wherein the first accumulation buffer stores an accumulation data set for each pixel of the frame, wherein each accumulation data set includes accumulated color data and a counter value;

a rendering block operably coupled to the mask buffer, the drawing buffer, and the Z buffer, wherein the rendering block renders images into the drawing buffer and the Z buffer, wherein the rendering block sets valid indications and pixel block indicators to indicate valid color data and valid Z data resulting from rendering operations; and a controller operably coupled to the rendering block, the drawing buffer, the mask buffer, and the first accumulation buffer, wherein when rendering of an image by the rendering block is completed, valid color data for pixels in pixel blocks corresponding to pixel block indicators that are set is blended by the controller with accumulated color data for corresponding pixels in the first accumulation buffer, wherein when blending of color data occurs for a pixel in the first accumulation buffer, the counter value for that pixel is incremented.

2. The accumulation buffering system of claim 1, wherein the rendering block utilizes pixel block indicators in rendering operations.

3. The accumulation buffering system of claim 2, wherein the rendering block stores pixel fragment color data for a fragment in the drawing buffer when a pixel block indicator for a pixel block to which the fragment corresponds indicates that the pixel block is cleared.

4. The accumulation buffering system of claim 1 further comprises:

a second accumulation buffer operably coupled to the controller, wherein the second accumulation buffer stores an accumulated data set for each pixel of the frame, wherein when accumulation operations are accumulating color data for the frame in the first accumulation buffer, the second accumulation buffer acts as an output buffer, and wherein when accumulation operations are accumulating color data for the frame in the second accumulation buffer, the first accumulation buffer acts as the output buffer.

5. The accumulation buffering system of claim 4 further comprises:

an output block operably coupled to the first and second accumulation buffers, wherein the output block normalizes color values in the output buffer by dividing accumulated color data for each pixel in the frame by the counter value corresponding to the pixel.

6. The accumulation buffering system of claim 5, wherein the output block is a display digital to analog converter.

7. The accumulation buffering system of claim 5, wherein the output block adds normalized color values to a frame buffer that includes additional image data.

8. The accumulation buffering system of claim 1 further comprises a write buffer operably coupled to the rendering block, wherein the write buffer stores at least a portion of an image for rendering.

9. A method for accumulation buffering of color data for a frame, comprising:

> rendering images to a drawing buffer and a Z buffer, wherein the Z buffer stores Z data for each pixel of the frame, wherein the drawing buffer stores a color data set for each pixel of the frame, wherein each color data set includes color data and a valid indication;
>
> when a color data set for a particular pixel is modified by a rendering operations, setting the valid bit within the color data set for the particular pixel in the drawing buffer and setting a pixel block indicator corresponding to a plurality of pixels that includes the particular pixel, wherein the pixel block indicator corresponding to the plurality of pixels that includes the particular pixel is included in a plurality of pixel indicators stored in a mask buffer, wherein each of the plurality of pixel indicators stored in the mask buffer corresponds to a plurality of pixels of the frame, wherein when a pixel block indicator is set, pixels included in a corresponding plurality of pixels that have set valid indications in the drawing buffer have valid color data stored in the drawing buffer and valid Z data stored in the Z buffer;
>
> after each image is rendered, blending valid color data included in the drawing buffer with accumulated color data stored in a first accumulation buffer, wherein valid color data in the drawing buffer is indicated by valid pixel block indicators in the mask buffer and valid indications in the drawing buffer, wherein the first accumulation buffer stores an accumulation data set for, each pixel of the frame, wherein each accumulation data set includes accumulated color data and a counter value;
>
> when accumulated color data for a pixel is modified by a blending operation, incrementing the counter value for the pixel; and
>
> when accumulation operations for a predetermined number of images has completed, normalizing color values in the first accumulation buffer by dividing accumulated color data for each pixel in the frame by the counter value for the pixel, wherein normalizing the color values produces normalized color values.

10. The method of claim 9, further comprises when accumulation operations for a predetermined number of images has completed, performing a subsequent accumulation operations for a subsequent predetermined number of images to a second accumulation buffer that is substantially similar to the first accumulation buffer, wherein at least a portion of the subsequent accumulation operations occur while the color values in the first accumulation buffer are normalized.

11. The method of claim 9, wherein rendering images to the drawing buffer and the Z buffer further comprises performing the rendering operations based on pixel block indicators included in the mask buffer.

12. The method of claim 11, wherein rendering images to the drawing buffer further comprises storing pixel fragment color data for a fragment in the drawing buffer when a pixel block indicator for a pixel block to which the fragment corresponds is cleared.

13. The method of claim 9, wherein normalizing the color values further comprises generating the normalized color values such that the normalized color values are included in an analog display signal.

14. The method of claim 9 further comprises adding the normalized color values to a frame buffer that includes additional image data.

15. An accumulation buffering processor, comprising:

> a processing module; and
>
> memory operably coupled to the processing module, wherein the memory stores operating instructions that, when executed by the processing module, cause the processing module to perform functions that include:
>
> rendering images to a drawing buffer and a Z buffer, wherein the Z buffer stores Z data for each pixel of a frame, wherein the drawing buffer stores a color data set for each pixel of the frame, wherein each color data set includes color data and a valid indication;
>
> when a color data set for a particular pixel is modified by a rendering operations, setting the valid bit within the color data set for the particular pixel in the drawing buffer and setting a pixel block indicator corresponding to a plurality of pixels that includes the particular pixel, wherein the pixel block indicator corresponding to the plurality of pixels that includes the particular pixel is included in a plurality of pixel indicators stored in a mask buffer, wherein each of the plurality of pixel indicators stored in the mask buffer corresponds to a plurality of pixel of the frame, wherein when a pixel block indicator is set, pixels included in a corresponding plurality of pixels that have set valid indications in the drawing buffer have valid color data stored in the drawing buffer and valid Z data stored in the Z buffer;
>
> after each image is rendered, blending valid color data included in the drawing buffer with accumulated color data stored in a first accumulation buffer, wherein valid color data in the drawing buffer is indicated by valid pixel block indicators in the mask buffer and valid indications in the drawing buffer, wherein the first accumulation buffer stores an accumulation data set for each pixel of the frame, wherein each accumulation data set includes accumulated color data and a counter value;
>
> when accumulated color data for a pixel is modified by a blending operation, incrementing the counter value for the pixel; and
>
> when accumulation operations for a predetermined number of images has completed, normalizing color values in the first accumulation buffer by dividing accumulated color data for each pixel in the frame by the counter value for the pixel, wherein normalizing the color values produces normalized color values.

16. The accumulation buffering processor of claim 15, wherein the memory includes operating instructions such that the processing module performs additional functions that include: when accumulation operations for a predetermined number of images has completed, performing a subsequent accumulation operations for a subsequent predetermined number of images to a second accumulation buffer that is substantially similar to the first accumulation buffer, wherein at least a portion of the subsequent accumulation operations occur while the color values in the first accumulation buffer are normalized.

17. The accumulation buffering processor of claim 15, wherein the memory includes operating instructions such that the processing module renders images to the drawing buffer and the Z buffer based on pixel block indicators included in the mask buffer.

18. The accumulation buffering processor of claim 15, wherein the memory includes operating instructions such that the processing module includes the normalized color values in an analog display signal.

19. The accumulation buffering processor of claim 15, wherein the memory includes operating instructions such that the processing module adds the normalized color values to a frame buffer that includes additional image data.

* * * * *